United States Patent [19]

Chien

[11] Patent Number: 4,963,858
[45] Date of Patent: Oct. 16, 1990

[54] CHANGEABLE INPUT RATIO MOUSE

[76] Inventor: Fong K. Chien, 3F-2 No. 3, Alley 6, Lane 118, Sec. 1, Chung Yand Road, Tu Cheng Hsiang, Taipei Hsien, Taiwan

[21] Appl. No.: 390,044

[22] Filed: Aug. 7, 1989

Related U.S. Application Data

[63] Continuation of Ser. No. 94,409, Sep. 8, 1987, abandoned.

[51] Int. Cl.$^5$ .............................................. G09G 1/00
[52] U.S. Cl. ................................... 340/710; 340/709; 33/1 M
[58] Field of Search ...................... 340/706, 709, 710; 178/18; 273/148 B; 33/1 C, 1 M, 297, 298

[56] References Cited

U.S. PATENT DOCUMENTS

| | | | |
|---|---|---|---|
| 4,552,360 | 11/1985 | Bromley et al. | 273/148 B |
| 4,561,183 | 12/1985 | Shores | 33/1 M |
| 4,698,626 | 10/1987 | Sato et al. | 340/710 |
| 4,716,291 | 12/1987 | Sakamoto et al. | 382/59 |
| 4,763,116 | 8/1988 | Eichholz | 340/710 |
| 4,831,736 | 5/1989 | Bryant, Sr. | 340/710 |

FOREIGN PATENT DOCUMENTS

| | | | |
|---|---|---|---|
| 0117324 | 6/1985 | Japan | 340/710 |
| 0160429 | 8/1985 | Japan | 340/710 |
| 0256832 | 12/1985 | Japan | 340/709 |

OTHER PUBLICATIONS

IBM Technical Disclosure Bulletin, "Mouse/Keyboard Concept Incorporating Unique Devices for Controlling CRT Display Cursors", vol. 27 No. 10B Mar. 1985.

Primary Examiner—Jeffery A. Brier
Attorney, Agent, or Firm—Lowe, Price, LeBlanc, Becker & Shur

[57] ABSTRACT

An input device in the form of a manually moveable unit or "mouse" provides coordinate-data information responsive to movement of the mouse across a planar surface. The mouse includes at least one manually operable button for changing a ratio of distance of mouse movement across the planar surface to an amount of coordinate-data information value change. This results in the ability to scale shapes or objects, the coordinates of which are to be input using the mouse, by selectively activating the ratio change button. To permit accurate tracing and scaling, the mouse includes a star shaped ordinate plate having a plurality of radial arms, each having a different shaped pointer. Each arm slidably engages into a corresponding groove in the mouse so that an opposite end of the ordinate plate is positioned for tracing the image to be input.

1 Claim, 5 Drawing Sheets

```
CHECKTURBO:
        MOV     A, R4
        JZ      READTURBO
        DEC     R4
        JMP     DO OUT

READTURBO:
        IN      A, P1
        ANL     A, #00011000B
        XRL     A, #00011000B
        JZ      TURBOEXIT
        RL      A
        SWAP    A
        ORL     A, #INDEX
        MOVP    A, @A
        MOV     R4, A

TURBO EXIT:
        JMP     MAIN LOOP

INDEX:
        BYTE    2
        BYTE    4
        BYTE    6
```

Fig 4

CHANGEABLE INPUT RATIO MOUSE

This application is a continuation of application Ser. No. 094,409, filed Sep. 8, 1987 now abandoned.

BACKGROUND OF THE INVENTION

The present invention relates to a changeable input ratio mouse which is combined by hardware and software to change ratio of the actual slide distance of the mouse and the corresponding distance of the moving cursor on screen to achieve lower cost and facilitate use thereof.

SUMMARY OF THE INVENTION

The present invention relates to a changeable input ratio mouse including a switch location the mouse operable so that a signal input ratio can be changed responsible to a position of the switch. Thus a small movement of the mouse repositions the cursor of a display screen by a factor of several times a normal displacement amount. Thus, an input unit equiped with an optical mouse requires a decreased area of reflection plate, therefore, it will lower cost and facilitate the uses.

BRIEF DESCRIPTION OF THE DRAWINGS

FIG. 4 is an assembly language program listing for implementing the variable input fuction of the present invention.

DESCRIPTION OF THE PREFERRED EMBODIMENTS

Figure 1:
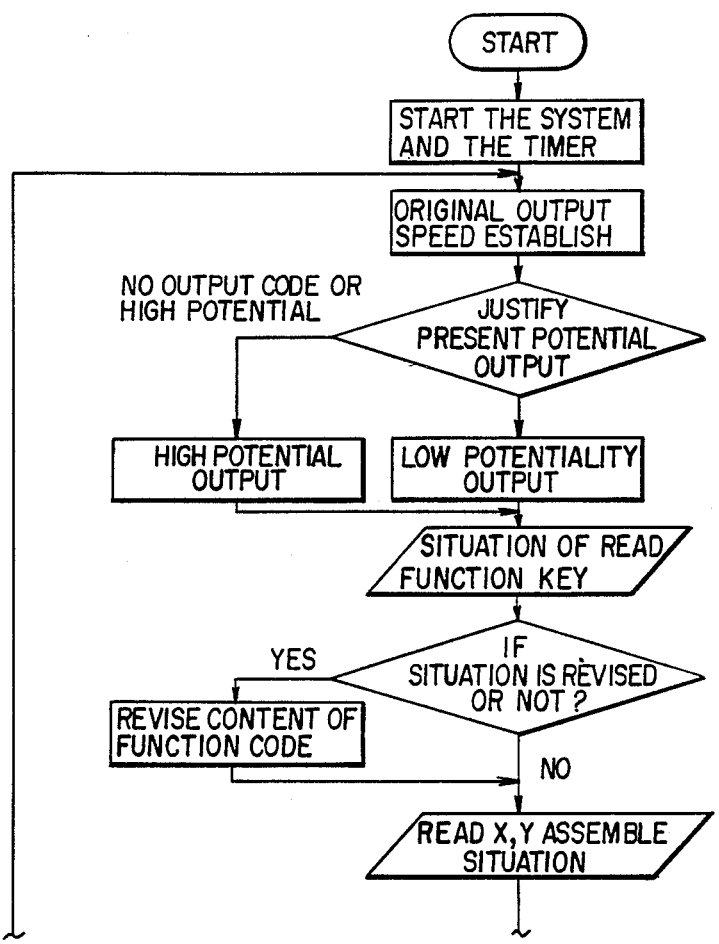
FIG. 1 is a flow chart of a program for implemention the varible input ratio of present invention.
Figure 1:
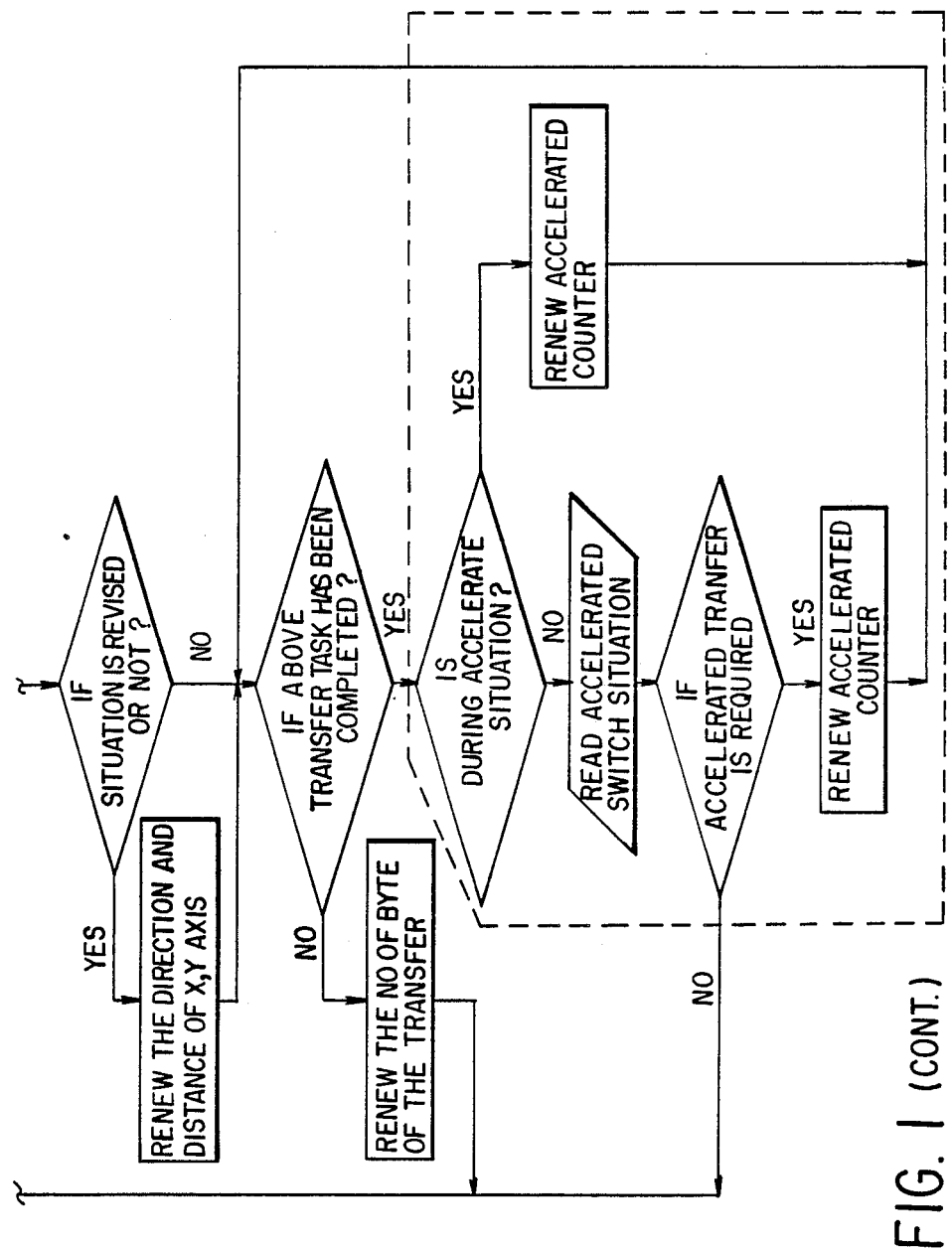

FIG. 1 is a flow chart of the software program of the present invention, the portion of the chart shown outside of the dashed box being a the logic path for a conventional mouse, when the power source is established, normal transfer speed (e.g. ratio of signal transfer) has been set. The program then starts to initialize certain parameters and read the slide direction and distance of the mouse. This portion of the flow chart is related to the conventional mouse that is regardless to the present invention within the description in this item.

Figure 2:
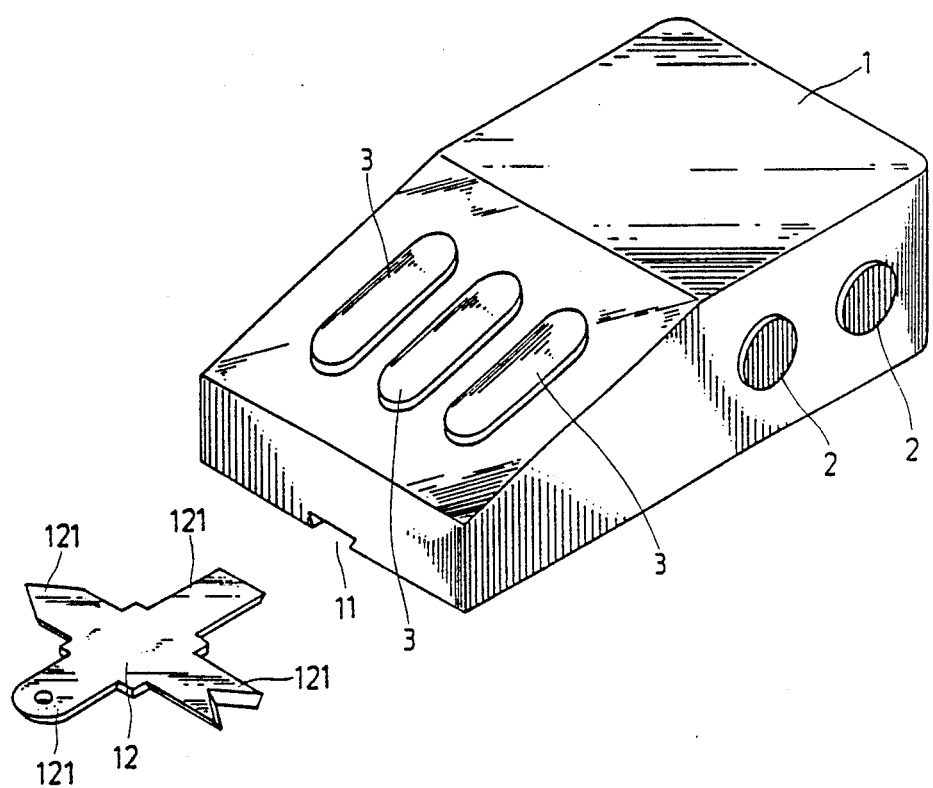
FIG. 2 is a prospective view of a preferred embodiment of the present invention.
Figure 3:
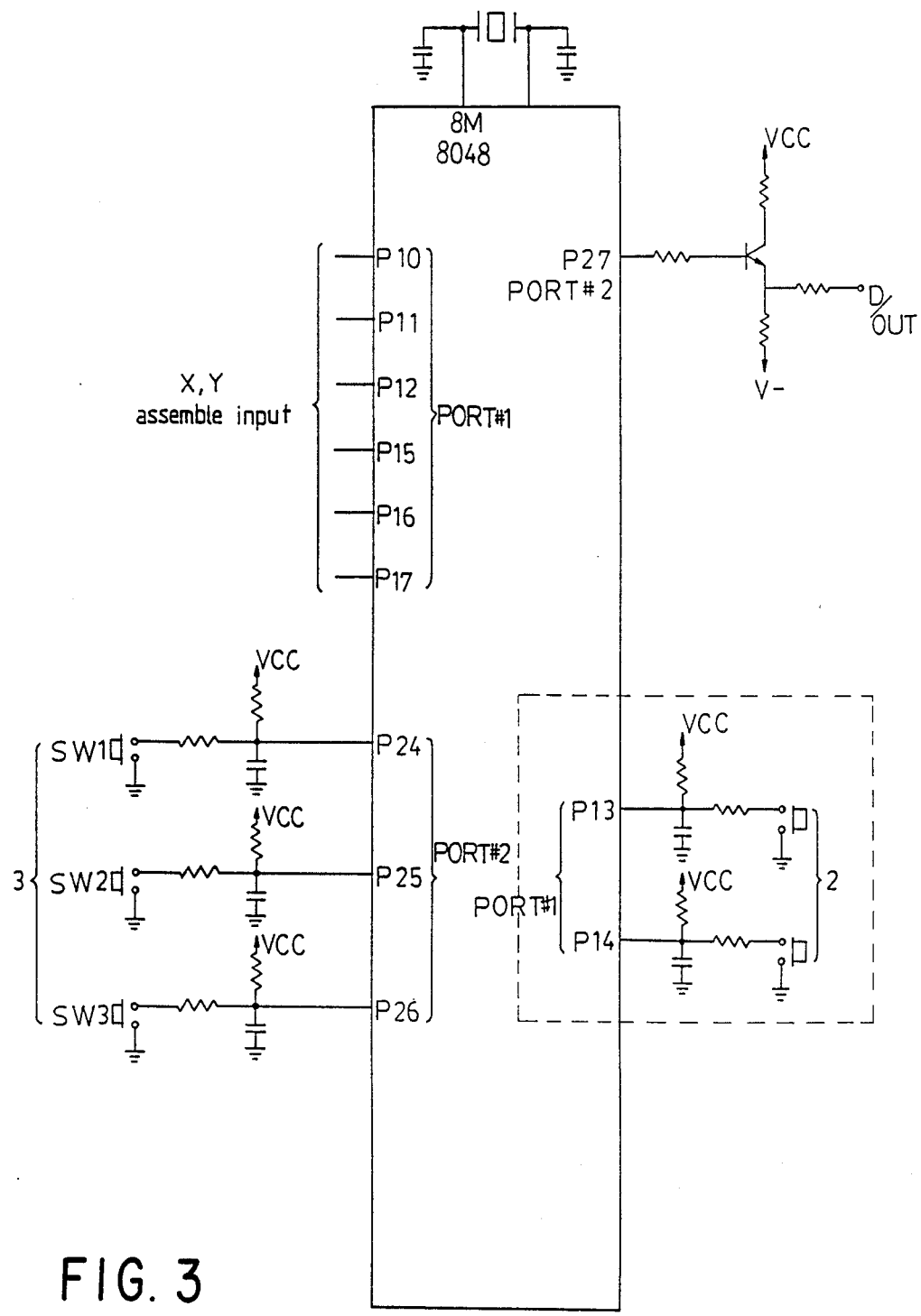
FIG. 3 is a circuit diagram of a preferred embodiment to of a logic circuit for varying the input ratio according the present invention.

FIG. 2 shows the physical appearance of the present invention including an acceleration switch for the changeable transfer ratio. The remaining three function keys 3 are of conventional design. In FIG. 3 showing the circuit diagram of the present invention, a 8048 used as CPU two acceleration switchs are positioned on it, thus enabling selection of three different types functions of accelerated transfer ratio. Sliding of the mouse generates X and Y assembly signals which are input from the output/input port #1, the multiplied signals which transfer to CPU will be output from terminal P27 of output/input port #2. Accelerated motion switches 2 are each connected to respective terminals P13, P14 of output/input port #1. When neither switch is activated, P13 and P14 will each receive a low potential level (Logic signal "0").

FIG. 4 is a listing of an application assembly language program for the present invention corresponding to the operations within the dotted line of the flow chart for FIG. 1. This illustrates the signal proceeded action for the present invention, the program will be reviewed firstly see whether the transfer ratio has been revised to accelerated sitution:

| | | |
|---|---|---|
| MOV | A,R4 | enable the data buffering of the register R4 transfer to accumulator A. |
| JZ | READTURBO | If the accumulator A appears 0, showing that it is not in accelerated situation then read directly the accelerated switch situation. |
| DEC | R4 | If the accumulator A is not 0, showing that it is in accelerated situation then subtract 1 from the transfer data in the register R4. |
| JMP | DO OUT | Repeat to execute the transfer signals program. |

Precedures of read accelerated switch are as follows:

| | | |
|---|---|---|
| IN | A,P1 | Read the 8 bits signals from the output/input port #1 store into the rotate left one bit, thus the signals of the accelerated switch will rotate to 4th and 6th bit from original 4th and 5th bit respectively. |
| SWAP | A | Enable the switch signals turn to 1st, 2nd bits from 5th and 6th bits. |
| ORL | A,#INDEX | According to the present situation of the switch signals (Which is "1"? or both are "1"?) to count the address of the referred schedule. |
| MOVP | A, A | The data information from the counted address will be stored into the accumulator A (e.g. both switchs are active and equal to "1", then the atored data "6" in the address of referred schedule will be stored into it, only a multiplied signal is transfered from the original now become to transfer 6 dotted signals, it means the transfer ratio has become 6 time higher than the original ratio.) |
| MOV | R4,A | The data of the accumulator A will be stored into the register R4. |

Program for terminate the accelerated transfer:

| | | |
|---|---|---|
| JMP | MAIN LOOP | Back to the main program |

In the present example, the data from the address of the relative schedule are:

| | |
|---|---|
| BYTE 2 | the first switch is active |
| BYTE 4 | the second switch is active |
| BYTE 6 | both switchs are active |

Please refer to FIG. 2 showing a trapezoid groove 11 onto which with a an ordinate plate 12 is inserted. Ordinate plate 12 is positioned near the bottom of the preferred embodiment 1 to the present invention. Ordinate plate 12 is a draft ordinate 121 with different convex shape to coordinate different input drawing from the mouse, the different shaped convex ordinate plate 121 can be selected and inserted into the groove 11. Draft ordinate plate 12 is combined with the mouse itself to achieve the patterns of drawing from different convex ordinate 121.

As shown in FIG. 2, the coordinate-data input device assists an operator in tracing an image by supplying coordinate data of the traced image to an external device, such as a computer. As shown in the figure, the housing includes a groove in the form of a dovetail slot for accepting an end of interchangeable ordinate plate 12. The input device includes detection circuitry for measuring sliding distances in two coordinates of the housing over a surface in contact with the housing. A processor contained in housing 1 is responsive to the motion detection circuitry and to switches 2, 3 for supplying a stream fo coordinate pair data in response to the measured sliding distances at least one of which is selectively multiplied by a predetermined constant in response to activation of the manual switches 2. On an end of interchangeable ordinate plate 12 are a number of radial arms 121, each having a different shaped pointer. Each arm 121 is adapted to slidably engage groove 11 of the housing and is located so that another arm of the ordinate plate is positioned to enable an operator to trace the image to be input by the device.

In accordance with the said procedures, the ratio of signal transfer will be change in accelerating to perform said advantage.

In the preferred embodiment, we use 8048 microprocessor as CPU, certainly other series no. of CPU adapted are inclusive for the present invention.

What is claimed is:

1. A coordinate-data input device for use by an operator for tracing an image and supplying coordinate data of the traced image, comprising:

a housing having a groove in a side thereof;

detecting means for measuring sliding distances in two coordinates of said housing over a surface in contact with said housing;

manually activated switch means;

processing means for supplying a stream of coordinate pair data in response to said measured sliding distances at least one of which is selectively multiplied by a predetermined constant in response to activation of said manually activated switch means; and an interchangeable ordinate plate having on an end thereof a plurality of radial arms each having a different shaped pointer, each arm adapted to slidably engage said groove of said housing and located so that another arm of said ordinate plate is positioned to enable said operator to trace said image.

* * * * *